United States Patent
Son et al.

(10) Patent No.: US 12,525,401 B2
(45) Date of Patent: Jan. 13, 2026

(54) MULTILAYERED CAPACITOR AND MANUFACTURING METHOD THEREOF

(71) Applicant: SAMSUNG ELECTRO-MECHANICS CO., LTD., Suwon-si (KR)

(72) Inventors: Soohwan Son, Suwon-si (KR); Younggyhu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 155 days.

(21) Appl. No.: 18/387,326

(22) Filed: Nov. 6, 2023

(65) Prior Publication Data
US 2024/0274360 A1    Aug. 15, 2024

(30) Foreign Application Priority Data
Feb. 13, 2023  (KR) .................. 10-2023-0018801

(51) Int. Cl.
*H01G 4/30*    (2006.01)
*H01G 4/232*   (2006.01)

(52) U.S. Cl.
CPC ............ *H01G 4/2325* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 2018/0151296 A1* | 5/2018 | Yamada | H01G 2/065 |
| 2020/0343046 A1 | 10/2020 | Hodgkinson et al. | |
| 2021/0217561 A1* | 7/2021 | Yun | H01G 4/012 |
| 2022/0301783 A1* | 9/2022 | Kyeong | H01G 4/1218 |

FOREIGN PATENT DOCUMENTS

| | | |
|---|---|---|
| JP | 2012-059911 A | 3/2012 |
| JP | 2022-085688 A | 6/2022 |
| KR | 10-2021-0146447 A | 12/2021 |

\* cited by examiner

*Primary Examiner* — Timothy J. Dole
*Assistant Examiner* — Esther N Lian
(74) *Attorney, Agent, or Firm* — Morgan Lewis & Bockius LLP

(57) ABSTRACT

A multilayered capacitor includes a capacitor body including a dielectric layer and an internal electrode, and an external electrode disposed outside the capacitor body, wherein the external electrode includes a first layer connected to the internal electrode, and a second layer covering at least a portion of the first layer, and the second layer includes resin and conductive polymer particles.

18 Claims, 6 Drawing Sheets

MULTILAYERED CAPACITOR AND MANUFACTURING METHOD THEREOF

CROSS-REFERENCE TO RELATED APPLICATION

This application claims priority to and the benefit of Korean Patent Application No. 10-2023-0018801 filed in the Korean Intellectual Property Office on Feb. 13, 2023, the entire contents of which are incorporated herein by reference.

TECHNICAL FIELD

This disclosure relates to a multilayered capacitor and a manufacturing method thereof.

BACKGROUND

According to technological developments in automotive electric device industries and IT industries, a demand for multilayered capacitors (MLCC) with improved performance and high reliability is increasing. In particular, since the automotive electric device industries require high reliability in the severe mechanical stress environment, the demand for multilayered capacitors is also focused on products with a predetermined level of bending strength characteristics.

The multilayered capacitors use external electrodes manufactured by mixing metal powder and a binder and then sintering them. The sintered external electrodes have an advantage of excellent electrical connectivity with internal electrodes but low ductility and thus vulnerability to mechanical stress.

Accordingly, in order to improve mechanical reliability of the multilayered capacitors, resin-based external electrodes manufactured by mixing the metal powder with a polymer resin are applied to the outside of the sintered external electrodes. The resin-based external electrodes have higher ductility than the sintered external electrodes and thus improve mechanical characteristics of the multilayered capacitors but have a problem of deteriorating electrical connectivity, compared with the sintered external electrodes.

The information disclosed in the Background section above is to aid in the understanding of the background of the present disclosure, and should not be taken as acknowledgement that this information forms any part of prior art.

SUMMARY

One aspect of the present disclosure may be directed to a multilayered capacitor which can improve bending strength due to a lower modulus of an external electrode, reduce acoustic noise of a substrate due to vibration of the multilayered capacitor, and enable the formation of a plating layer without additional processing.

A multilayered capacitor according to one aspect includes a capacitor body including a dielectric layer and an internal electrode, and an external electrode disposed outside the capacitor body, wherein the external electrode includes a first layer connected to the internal electrode, and a second layer covering at least a portion of the first layer, and the second layer includes resin and conductive polymer particles.

The conductive polymer particles may include polypyrrole, polyaniline, polythiophene, [poly(3,4-ethylenedioxythiophene)]:[poly(styrene sulfonate)] (PEDOT:PSS), or a combination thereof.

An average particle diameter of the conductive polymer particles may be about 0.1 µm to about 5 µm.

The conductive polymer particles may further include a metal coating layer on their surfaces.

The conductive polymer particles may include polymethylmethacrylate (PMMA), polymethylacrylate (PMA), polystyrene, or a combination thereof.

The metal coating layer of the conductive polymer particles may include nickel (Ni), copper (Cu), aluminum (Al), silver (Ag), gold (Au), platinum (Pt), lead (Pb), tin (Sn), an alloy thereof, or a combination thereof.

An average thickness of the metal coating layer may be about 5 nm to about 200 nm.

The capacitor body has first and second surfaces facing each other in a stacking direction of the dielectric layer and the internal electrode, third and fourth surfaces facing each other in a longitudinal direction perpendicular to the stacking direction, and fifth and sixth surfaces facing each other in a width direction perpendicular to the stacking direction and the longitudinal direction, wherein in a cross section cut perpendicular to the width direction from a center of the width direction of the multilayered capacitor in the longitudinal direction and stacking direction, an average length in the stacking direction of the second layer disposed on the third or fourth surface is about 20% to about 70% of an average length in the stacking direction of the external electrode, and an average length in the longitudinal direction of the second layer disposed on the first surface is about 80% to about 100% of an average length in the longitudinal direction of the external electrode.

The capacitor body may have first and second surfaces facing each other in a stacking direction of the dielectric layer and internal electrode, third and fourth surfaces facing each other in a longitudinal direction perpendicular to the stacking direction, and fifth and sixth surfaces facing each other in a width direction perpendicular to the stacking direction and the longitudinal direction.

The second layer may cover a portion of the first layer and expose other portions of the first layer.

The second layer may be disposed only on the first surface.

The second layer may be disposed on the first surface, but not on the second surface.

The first layer may be disposed on the first surface, the second surface, and the third or fourth surface.

The second layer may be disposed on the first surface and the third or fourth surface.

The external electrode may further include a third layer covering the first layer and second layer.

The third layer may be disposed on the first surface, the second surface, and the third or fourth surface.

The first, second, and third layers may be disposed on the fifth and sixth surfaces.

At the third or fourth surface, an average length in the stacking direction of the second layer may be less than or equal to an average length in the stacking direction of the first layer.

The second layer may further include a conductive metal.

A method of manufacturing a multilayered capacitor according to another aspect includes manufacturing a capacitor body including a dielectric layer and an internal electrode, and forming an external electrode outside the capacitor body, wherein the forming of the external electrode includes forming a first layer outside the capacitor body, and coating a paste for forming a second layer including a resin and conductive polymer particles to cover at least a portion of the first layer to form the second layer.

In the paste for forming the second layer, a content of the conductive polymer particles relative to the total weight of the resin and the conductive polymer particles may be about 30 wt % to about 85 wt %.

The paste for forming the second layer may be coated such that a portion of the first layer is covered by the second layer and other portions of the first layer are exposed by not being covered by the second layer.

The method may further include forming a third layer covering the first and second layers.

The multilayered capacitor according to one aspect can improve bending strength due to a lower modulus of an external electrode, reduce acoustic noise of a substrate due to vibration of the multilayered capacitor, and enable the formation of a plating layer without additional processing.

The apparatus and method of the present disclosure have other features and advantages which will be apparent from or are set forth in more detail in the accompanying drawings, which are incorporated herein, and the following Detailed Description, which together serve to explain certain principles of the present disclosure.

Figure 1:
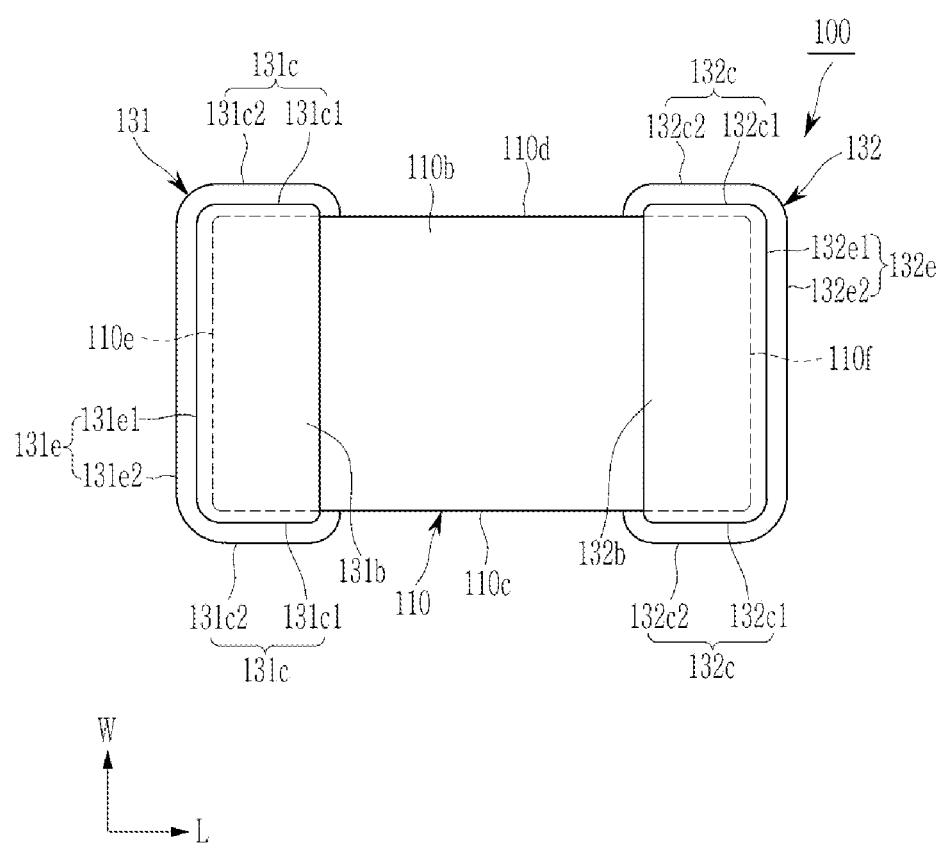
FIG. 1 is a plan view of a multilayered capacitor according to one exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE EMBODIMENTS

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
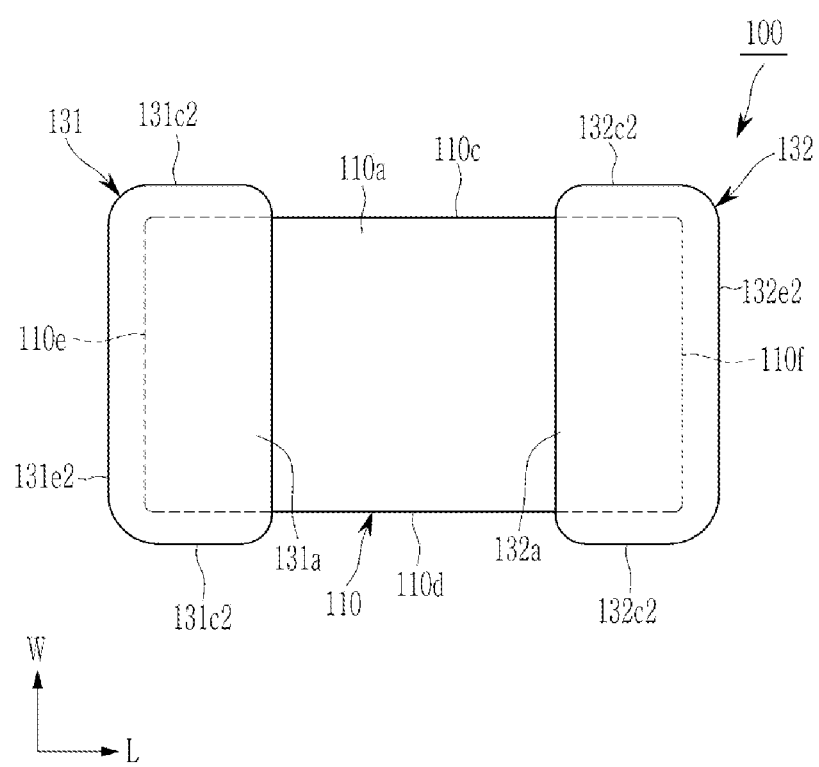
FIG. 2 is another plan view of a multilayered capacitor according to one exemplary embodiment of the present disclosure.
Figure 3:
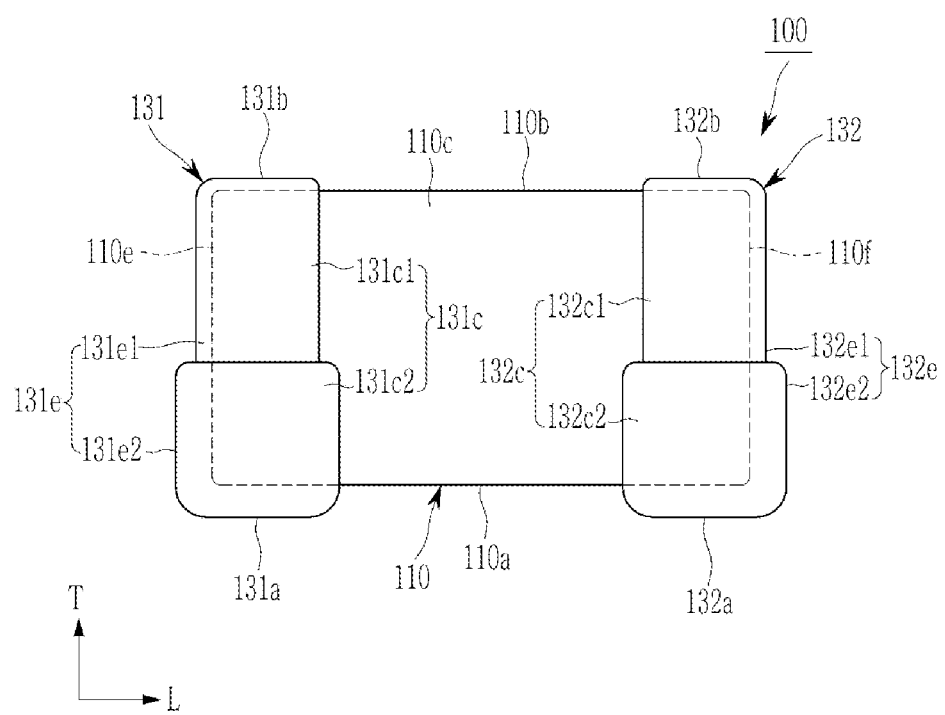
FIG. 3 is a side view of a multilayered capacitor according to one exemplary embodiment of the present disclosure.
Figure 4:
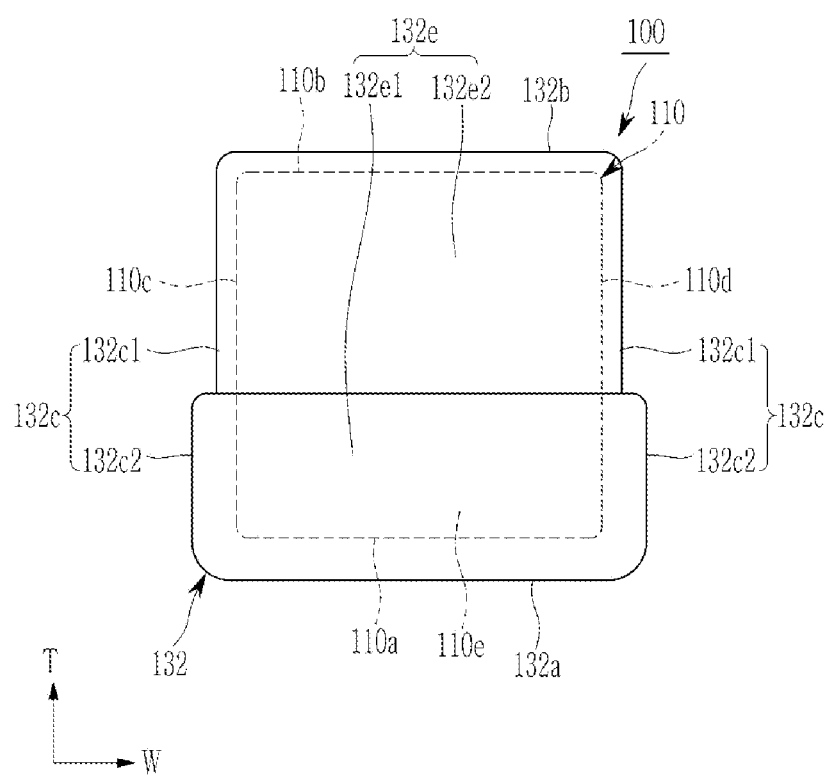
FIG. 4 is another side view of a multilayered capacitor according to one exemplary embodiment of the present disclosure.
Figure 5:
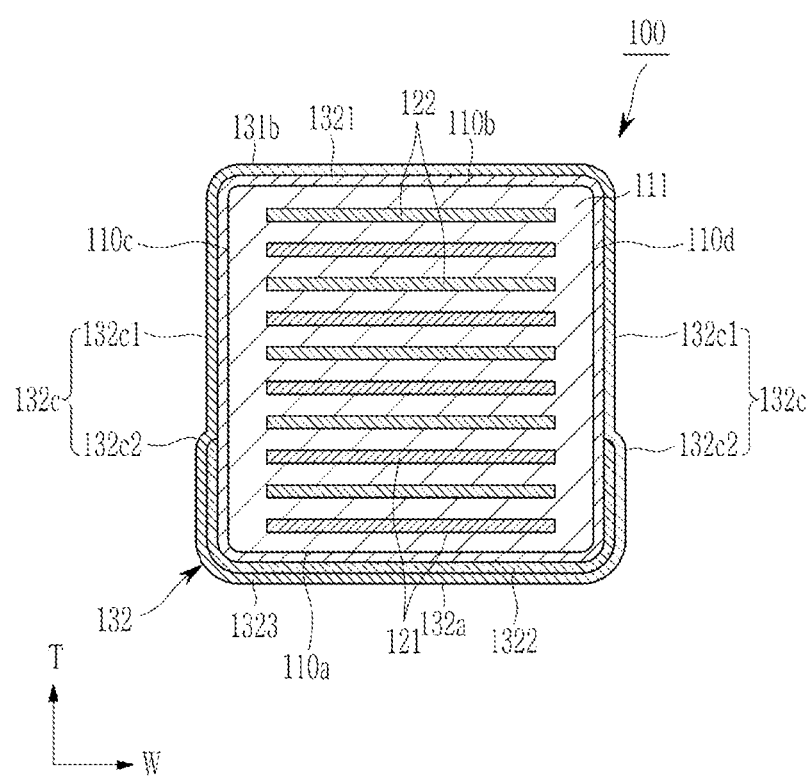
FIG. 5 is cross-sectional view of a multilayered capacitor according to one exemplary embodiment of the present disclosure.
Figure 6:
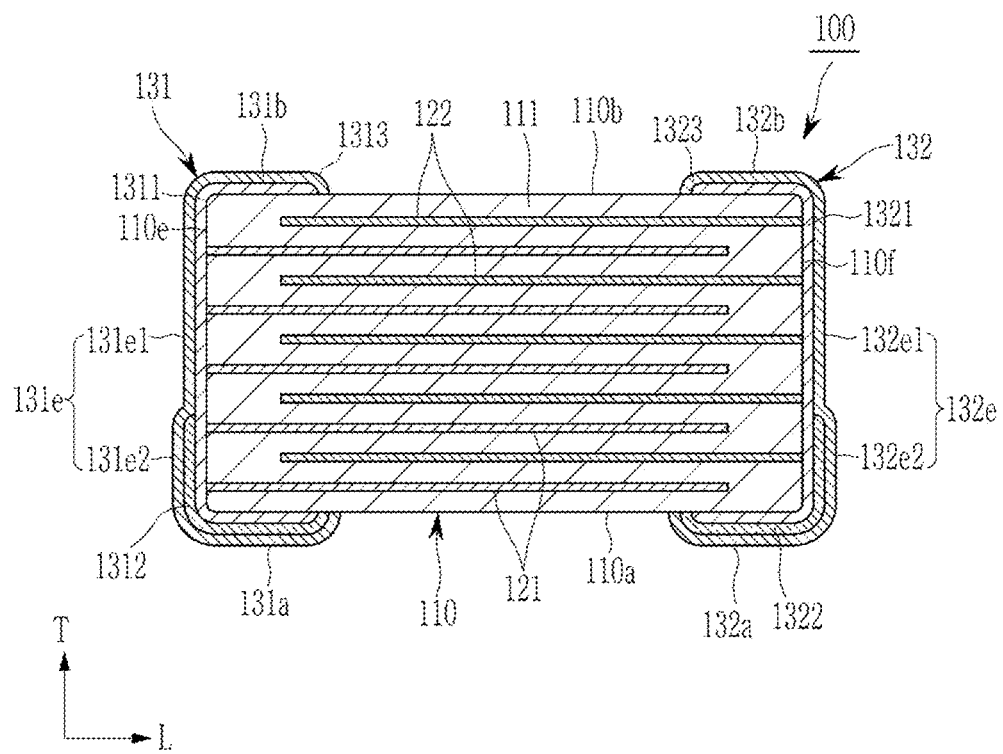
FIG. 6 is another cross-sectional view of a multilayered capacitor according to one exemplary embodiment of the present disclosure.

FIG. 1 is a plan view of a multilayered capacitor according to one exemplary embodiment of the present disclosure, FIG. 2 is another plan view of a multilayered capacitor according to one exemplary embodiment of the present disclosure, FIG. 3 is a side view of a multilayered capacitor according to one exemplary embodiment of the present disclosure, FIG. 4 is another side view of a multilayered capacitor according to one exemplary embodiment of the present disclosure, FIG. 5 is cross-sectional view of a multilayered capacitor according to one exemplary embodiment of the present disclosure, and FIG. 6 is another cross-sectional view of a multilayered capacitor according to one exemplary embodiment of the present disclosure.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 6, the multilayered capacitor 100 according to the present embodiment may include the capacitor body 110, and first and second external electrodes 131 and 132 disposed at both ends of the capacitor body 110 which face each other in the longitudinal direction (L-axis direction).

The capacitor body 110 may have, for example, a substantially hexahedral shape.

In this embodiment, for convenience of explanation, in the capacitor body 110, surfaces opposite to each other in the thickness direction (T-axis direction) are defined as first and second surfaces 110a and 110b, surfaces connected to the first and second surfaces 110a and 110b and facing each other in the longitudinal direction (L-axis direction) are defined as third and fourth surfaces 110e and 110f, and surfaces connected to the first and second surfaces 110a and 110b, connected to the third and fourth surfaces 110e and 110f, and facing each other in the width direction (W-axis direction) are defined as fifth and sixth surfaces 110c and 110d.

For example, the first surface 110a, which is a lower surface, may be a surface facing a mounting direction. In addition, the first to sixth surfaces 110a, 110b, 110e, 110f, 110c, and 110d may be flat, but the present embodiment is not limited thereto, for example, the first to sixth surfaces 110a, 110b, 110e, 110f, 110c, and 110d may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and a plurality of first and second internal electrodes 121 and 122 which are alternately disposed in a thickness direction (T-axis direction) with the dielectric layers 111 interposed therebetween. For example, the first and second internal electrodes 121 and 122 may have different polarities.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions.

The active region contributes to generating a capacitance of the multilayered capacitor 100. For example, the active region may be a region in which the first and second internal electrodes 121 and 122 are stacked and overlapped with each other along the thickness direction (T-axis direction).

The cover regions may be respectively disposed on the first and the second surfaces 110a and 110b of the active region in the thickness direction (T-axis direction) as margin portions. The cover regions may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces 110c and 110d of the active region in the width direction (W-axis direction). Such a side cover region may be formed by coating a conductive paste layer for forming an internal electrode only on a portion of the surface of the dielectric green sheet, stacking dielectric green sheets on which a conductive paste layer is not coated on both side surfaces of the dielectric green sheet, and firing the same.

The cover regions and the side cover regions serve to prevent damage to the first and second internal electrodes 121 and 122 due to physical or chemical stress.

For example, the dielectric layer 111 may include a ceramic material having a high dielectric constant. For example, the ceramic material may include a dielectric ceramic containing components such as $BaTiO_3$, $CaTiO_3$, $SrTiO_3$, or $CaZrO_3$, and the like. In addition, auxiliary components such as a Mn compound, an Fe compound, a Cr compound, a Co compound, and a Ni compound may be further included in addition to these components. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, etc. are partially dissolved in $BaTiO_3$-based dielectric ceramics.

In addition, a ceramic powder, a ceramic additive, an organic solvent, a plasticizer, a binder, a dispersant, and the like may be further added to the dielectric layer 111. The ceramic additive may include, for example, transition metal oxide or transition metal carbide, a rare earth element, magnesium (Mg), or aluminum (Al), and the like.

For example, an average thickness of the dielectric layer 111 may be about 0.5 μm to about 10 μm.

The first and second internal electrodes 121 and 122 are electrodes having different polarities, and are alternately disposed to face each other along the thickness direction (T-axis direction) with the dielectric layer 111 interposed therebetween, and one end thereof may be exposed through the third and fourth surfaces 110e and 110f of the capacitor body 110.

The first and second internal electrodes 121 and 122 may be electrically insulated from each other by the dielectric layer 111 disposed in the middle.

Ends of the first and second internal electrodes 121 and 122 alternately exposed through the third and fourth surfaces 110e and 110f of the capacitor body 110 are connected to the first and second external electrodes 131 and 132, respectively, to be electrically connected.

The first and second internal electrodes 121 and 122 may include a conductive metal, for example, a metal such as Ni, Cu, Ag, Pd, or Au, and the like, an alloy thereof, for example an Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrodes 121 and 122 may be about 0.1 μm to about 2 μm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first and second external electrodes 131 and 132 may respectively have first to fourth electrode portions 131a, 132a, 131b, 132b, 131c, 132c, 131e, and 132e. The first electrode portions 131a and 132a are disposed on the first surface 110a. The second electrode portions 131b and 132b are disposed on the second surface 110b. The third electrode portions 131c and 132c are disposed on a pair of fifth and sixth surfaces 110c and 110d. The fourth electrode portions 131e and 132e are disposed on the corresponding third and fourth surfaces 110e and 110f. In other words, the first and second external electrodes 131 and 132 are disposed respectively on the first and second surfaces 110a and 110b, the fifth and sixth surfaces 110c and 110d, and the third surface 110e or the fourth surface 110f and thus on the five surfaces in total. The first to fourth electrode portions 131a, 132a, 131b, 132b, 131c, 132c, 131e, and 132e adjacent to each other are connected at the corners of the capacitor body 110 and thus electrically connected.

The fourth electrode portions 131e and 132e cover ends exposed to the third and fourth surfaces 110e and 110f of the first and second internal electrodes 121 and 122. The first and second internal electrodes 121 and 122 are directly connected to the fourth electrode portions 131e and 132e and respectively electrically connected to the first and second external electrodes 131 and 132.

The first and second external electrodes 131 and 132 respectively have first layers 1311 and 1321 and second layers 1312 and 1322 and optionally, third layers 1313 and 1323. The third layers 1313 and 1323 may form outermost layers of the first and second external electrodes 131 and 132.

The first electrode portions 131a and 132a have the first layers 1311 and 1321, the second layers 1312 and 1322, and the third layers 1313 and 1323. In other words, the first electrode portions 131a and 132a have a three-layered structure. In the first electrode portions 131a and 132a, the first layers 1311 and 1321 may be entirely covered with the second layers 1312 and 1322.

The second electrode portions 131b and 132b have the first layers 1311 and 1321 and the third layers 1313 and 1323 but no second layers 1312 and 1322. In other words, the second electrode portions 131b and 132b have a two-layered structure.

The third electrode portions 131c and 132c have the first regions 131c1 and 132c1 and the second regions 131c2 and 132c2. The second regions 131c2 and 132c2 are disposed closer to the first surface 110a than the first regions 131c1 and 132c1. The first regions 131c1 and 132c1 have the first layers 1311 and 1321 and the third layers 1313 and 1323 but no second layers 1312 and 1322. In other words, the first regions 131c1 and 132c1 have a two-layered structure. The second regions 131c2 and 132c2 have the first layers 1311 and 1321, the second layers 1312 and 1322, and the third layers 1313 and 1323. In other words, the second regions 131c2 and 132c2 have a three-layered structure.

The fourth electrode portions 131e and 132e have the first regions 131e1 and 132e1 and the second regions 131e2 and 132e2. The second regions 131e2 and 132e2 are disposed closer to the first surface 110a than the first regions 131e1 and 132e1. The first regions 131e1 and 132e1 have the first layers 1311 and 1321 and the third layers 1313 and 1323 but no second layers 1312 and 1322. In other words, the first regions 131e1 and 132e1 have a two-layered structure. The second regions 131e2 and 132e2 have the first layers 1311 and 1321, the second layers 1312 and 1322, and the third layers 1313 and 1323. In other words, the second regions 131e2 and 132e2 have a three-layered structure.

The first layers 1311 and 1321 directly contact the capacitor body 110 and are disposed respectively on the third and fourth surfaces 110e and 110f of the capacitor body 110 and thus connected with the first and second internal electrodes 121 and 122. The first layers 1311 and 1321 are disposed on the first electrode portions 131a and 132a, the second electrode portions 131b and 132b, the first regions 131c1 and 132c1 and the second regions 131c2 and 132c2 of the third electrode portions 131c and 132c, and the first regions 131e1 and 132e1 and second regions 131e2 and 132e2 of the fourth electrode portions 131e and 132e. In other words, the first layers 1311 and 1321 may be disposed on the first surface 110a, the second surface 110b, the third surface 110e, the fourth surface 110f, the fifth surface 110c, and the sixth surface 110d. For example, the first layers 1311 and 1321 may be a sintered metal layer.

The second layers 1312 and 1322 are disposed to cover portions of the first layers 1311 and 1321 but expose other portions thereof. The second layers 1312 and 1322 are disposed on the first electrode portions 131a and 132a, the second regions 131c2 and 132c2 of the third electrode portions 131c and 132c, and the second regions 131e2 and 132e2 of the fourth electrode portions 131e and 132e. In other words, the second layers 1312 and 1322 may be disposed on the first surface 110a alone. Or, the second layers 1312 and 1322 may not be disposed on the second surface 110b. The second layers 1312 and 1322 may be disposed on the first surface 110a, the third surface 110e or the fourth surface 110f, the fifth surface 110c, and the sixth surface 110d. When the second layers 1312 and 1322 are disposed on the first surface 110a but not on the second surface 110b, bending stress is divided into both directions, further increasing resistance to bending cracks. On the other hand, when the second layers 1312 and 1322 are disposed all on the first surface 110a, the second surface 110b, the third surface 110e or the fourth surface 110f, the fifth surface 110c, and the sixth surface 110d, contact resistance may be increased, resulting in increasing ESR (equivalent series resistance).

For example, the second layers 1312 and 132 may be a conductive resin layer including a resin and conductive polymer particles.

The third layers 1313 and 1323 are disposed to cover the second layers 1312 and 1322 and the entire exposed first layers 1311 and 1321. The third layers 1313 and 1323 may be disposed in the first regions 131c1 and 132c1 and the second regions 131c2 and 132c2 of the first electrode portions 131a and 132a, the second electrode portions 131b and 132b, the third electrode portions 131c and 132c and also, the first regions 131e1 and 132e1 and the second regions 131e2 and 132e2 of the fourth electrode portions 131e and 132e. In other words, the third layers 1313 and 1323 may be disposed on the first surface 110a, the second surface 110b, the third surface 110e, the fourth surface 110f, the fifth surface 110c, and the sixth surface 110d. For example, the third layers 1313 and 1323 may be a plating layer.

The first layers 1311 and 1321, which the first to fourth electrode portions 131a, 132a, 131b, 132b, 131c, 132c, 131e, and 132e respectively have, may be integrally connected. The second layers 1312 and 1322, which the first, third, and fourth electrode portions 131a, 132a, 131c, 132c, 131e, and 132e respectively have, may be integrally connected. The third layers 1313 and 1323, which the first to fourth electrode portions 131a, 132a, 131b, 132b, 131c, 132c, 131e, and 132e respectively have, may be integrally connected. Below, an average length of the first to third layers 1311, 1321, 1312, 1322, 1313, and 1323 may be measured by examining a cross section (cross-section of the L-axis direction and the T-axis direction) of the multilayered capacitor 100 cut in a longitudinal direction and a stacking direction perpendicularly to the width direction (W-axis direction) at the center (½ point) of the width direction, for example, a cross-section cut perpendicularly to the width direction with a scanning electron microscope (SEM) or a scanning transmission electron microscope (STEM). In addition, the measurement is performed on at least three different cross-sections and calculating an arithmetic mean thereof.

In one example, a length of each of the first to third layers 1311, 1321, 1312, 1322, 1313, and 1323 may be measured between two outermost surfaces of the corresponding layer that are facing in the same direction as a measurement direction (e.g., T-axis direction, L-axis direction, or W-axis direction). Other measurement methods and/or tools appreciated by one of ordinary skill in the art, even if not described in the present disclosure, may also be used.

In addition, an average particle diameter, an average area, a component, and the like of the resin or the conductive polymer particles of the second layers 1312 and 1322 may be measured by taking cross-section photographs with SEM or STEM, and the like and analyzing the images with an electron beam microanalyzer (EPMA). When the component analysis is performed with the electron beam microanalyzer (EPMA), an energy dispersive spectroscope (EDS), or an wavelength dispersive spectroscope (WDS), as an X-ray spectrometer may be used. For example, when the cross-sections of the first and second external electrodes 131 and 132 are examined by using a reflected electron image of SEM, an HAADF image of STEM, or the like, a conductive metal having a metallic bond may be recognized as a bright part in contrast, and a non-metal component (including other voids or oxides) such as the resin, the conductive polymer particles, and the like may be recognized as a dark part in the contrast. Accordingly, the average area of the resin and the conductive polymer particles of the second layers 1312 and 1322 may be obtained as a ratio of an area of the bright part in the contrast to a total area of the entire measurement field, for example, by binarizing the cross-section photograph, and the like. In addition, the measurement may be performed on at least three different cross-sections and calculating an arithmetic mean thereof.

In addition, after obtaining a particle diameter of each conductive polymer particle as an average value of a major axis of the conductive polymer particle and a minor axis perpendicular thereto, the average particle size of the conductive polymer particles may be obtained as an arithmetic mean of particle sizes of three, five, or ten conductive polymer particles, but the number of conductive polymer particles that are taken for the arithmetic mean value is not limited thereto.

At the third surface 110e, an average length in the stacking direction (T-axis direction) of the second layer 1312 is less than or equal to an average length in the stacking direction (T-axis direction) of the first layer 1311. For example, at the third surface 110e, an average length in the stacking direction (T-axis direction) of the second layer 1312 may be about 20% to about 70% of an average length in the stacking direction (T-axis direction) of the first external electrode 131. When the average length in the stacking direction (T-axis direction) of the second layer 1312 on the third surface 110e is greater than about 70% of that of the stacking direction (T-axis direction) of the first external electrode 131, contact resistance may be lowered, resulting in reducing ESR (equivalent series resistance). Similarly, an average length of the second layer 1322 in the stacking direction (T-axis direction) on the fourth surface 110f may be smaller than or equal to that of the first layer 1321 in the stacking direction (T-axis direction).

Since the bending strength characteristics are improved by the second layers 1312 and 1322, a thickness of the second layers 1312 and 1322, that is, the average dimension in the longitudinal direction (L-axis direction) on the third surface 110e may be, for example, greater than or equal to about 2 µm, or about 5 µm to about 10 µm. When the average dimension of the second layers 1312 and 1322 in the longitudinal direction (L-axis direction) on the third surface 110e or the fourth surface 110f is less than about 2 µm, the bending strength may be insignificantly improved.

The average length of the second layers 1312 and 1322 in the longitudinal direction on the first surface 110a may be larger than or equal to that of the first layers 1311 and 1321 in the longitudinal direction. For example, the average length of the second layer 1312 in the longitudinal direction on the first surface 110a may be about 80% to about 100% of that of the first external electrode 131 in the longitudinal direction. Similarly, the average length of the second layer 1322 in the longitudinal direction on the first surface 110a may be about 80% to about 100% of that of the second external electrode 132 in the longitudinal direction. Accordingly, on the first surface 110a, the second layers 1312 and 1322 may be disposed to entirely cover the first layers 1311 and 1321. The first layers 1311 and 1321 may be for example a sintered metal layer. The sintered metal layer may include a conductive metal and glass.

For example, the sintered metal layer may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, as a conductive metal, and for example the copper (Cu) may include a copper (Cu) alloy. When the conductive metal includes copper, a metal other than copper may be included in an amount of less than or equal to about 5 parts by mole based on 100 parts by mole of copper.

For example, the sintered metal layer may include a composition of oxides as a glass, for example, one or more selected from a silicon oxide, a boron oxide, an aluminum oxide, a transition metal oxide, an alkali metal oxide, and an alkaline earth metal oxide. The transition metal may be selected from zinc (Zn), titanium (Ti), copper (Cu), vanadium (V), manganese (Mn), iron (Fe), and nickel (Ni); the alkali metal may be selected from lithium (Li), sodium (Na), and potassium (K); and the alkaline-earth metal may be selected from magnesium (Mg), calcium (Ca), strontium (Sr), and barium (Ba).

Each content of the conductive metal and the glass in the sintered metal layer is not particularly limited, but for example, on the cross-section (L-axis direction and T-axis direction cross-section) of the multilayered capacitor 10 cut in the longitudinal direction or the stacking direction perpendicular to the width direction (W-axis direction) at the center (½ point) of the width direction (W-axis direction), an average area ratio of the conductive metal may be about 30% to about 90% or about 70% to about 90% of a unit area of the sintered metal layers 1311 and 1321.

The second layers 1312 and 1322 may be a conductive resin layer.

The conductive resin layer includes a resin and conductive polymer particles.

When the second layers 1312 and 1322 mainly disposed on the first surface 110a, for example, on the mounting surface include the conductive resin layer, bending stress may be reduced, resulting in improving the bending strength, and since the conductive resin layer also includes the conductive polymer particles, a plating layer may be formed without a separate treatment, wherein unlike a conventional conductive resin layer including metal particles such as copper (Cu) and the like, since the conductive resin layer of the second layers 1312 and 1322 may incudes no metal particles and thus has a lower modulus, the bending strength may be improved, and acoustic noise of a substrate by vibration of the multilayered capacitor 100 may be reduced.

The resin included in the conductive resin layer is not particularly limited as long as it has bondability and impact absorption properties and can be mixed with the conductive metal powder to form a paste, and may include, for example, a phenolic resin, an acrylic resin, a silicone resin, an epoxy resin, or a polyimide resin.

The conductive polymer particles included in the conductive resin layer play a role of electrically connecting the second layers 1312 and 1322 with the first and second internal electrodes 121 and 122, the sintered metal layer, or the plating layer.

The conductive polymer particles may be in the form of particles of a conductive polymer, wherein the conductive polymer may include polypyrrole, polyaniline, polythiophene, [poly(3,4-ethylenedioxythiophene)]:[poly(styrene sulfonate)] (PEDOT:PSS), or a combination thereof.

An average particle diameter of the conductive polymer particle may be about 0.1 µm to about 5 µm, for example about 1 µm to about 3 µm. When the conductive polymer particles have an average particle diameter of less than about 0.1 µm, dispersion and coating workability may be deteriorated, and when the conductive polymer particles have an average particle diameter of greater than about 5 µm, contacts among the conductive polymer particles may be deteriorated, resultantly increasing resistance.

The conductive polymer particles may further include a metal coating layer on their surfaces.

When the conductive polymer particles further include a metal coating layer on the surface, since the metal coating layer plays a role of imparting conductivity, the conductive polymer particles may be polymers having no conductivity. For example, the conductive polymer particles may be prepared into conductive polymers by forming the metal coating layer on most of the polymers having a particle shape (spherical or hemispherical shape) such as polymethylmethacrylate (PMMA), polymethylacrylate (PMA), polystyrene, and the like.

When the conductive resin layer includes the conductive polymer particles including the metal coating layer, since electrical conductivity is not only well maintained due to metal components coated on the surface, but also the polymer particles may bring about a low modulus, further improving the bending strength. In addition, the acoustic noise, which is generated by vibration of the substrate to which vibration of the multilayered capacitor 100 is transmitted, may be further reduced, wherein since the conductive polymer particles are included therein, the substrate vibration is transmitted as vibration of the conductive polymer particles.

The metal coating layer of the conductive polymer particle may include nickel (Ni), copper (Cu), aluminum (Al), silver (Ag), gold (Au), platinum (Pt), lead (Pb), tin (Sn), an alloy thereof, or a combination thereof, and for example, the metal coating layer may include copper (Cu).

An average thickness of the metal coating layer may be about 5 nm to about 200 nm, or about 20 nm to about 100 nm. When the average thickness of the metal coating layer is less than about 5 nm, conductivity may be deteriorated, and when it is greater than about 200 nm, uniformity of the metal coating may be deteriorated.

Optionally, the second layers 1312 and 1322 may further include a conductive metal. The conductive metal included in the second layers 1312 and 1322 may allow the second layers 1312 and 1322 to better electrically connect with the first and second inner electrodes 121 and 122, the sintered metal layer, or the plating layer.

The conductive metal included in the conductive resin layer may have a spherical shape, a flake shape, or a combination thereof. That is, the conductive metal may be formed only in a flake shape, only in a spherical shape, or may have a mixed shape of a flake shape and a spherical shape.

Herein, the spherical shape may also include a shape that is not perfectly spherical, and may include a shape in which, for example, a length ratio between a major axis and a minor axis (long axis/short axis) is less than or equal to about 1.45. The flake-shaped powder means a powder having a flat and elongated shape, and is not particularly limited, but, for example, a length ratio between a major axis and a minor axis (long axis/short axis) may be greater than or equal to about 1.95.

The conductive resin layer may include copper (Cu), silver (Ag), nickel (Ni), or a mixture thereof as a conductive metal.

The third layers 1314 and 1324 may be a plating layer.

The plating layer may include nickel (Ni), copper (Cu), tin (Sn), palladium (Pd), platinum (Pt), gold (Au), silver (Ag), tungsten (W), titanium (Ti), or lead (Pb), alone or an alloy thereof. For example, the plating layer may be a nickel (Ni) plating layer or a tin (Sn) plating layer, and may have a form in which a nickel (Ni) plating layer and a tin (Sn) plating layer are sequentially stacked or a tin (Sn) plating layer, a nickel (Ni) plating layer, and a tin (Sn) plating layer are sequentially stacked. In addition, the plating layer may include a plurality of nickel (Ni) plating layers and/or a plurality of tin (Sn) plating layers.

The plating layer may improve mountability of the multilayered capacitor 100 with a board, structural reliability, external durability, heat resistance, and equivalent series resistance (ESR).

A method of manufacturing a multilayered capacitor according to another example embodiment includes manufacturing a capacitor body including a dielectric layer and an internal electrode, and forming an external electrode outside the capacitor body.

First, the manufacturing of the capacitor body is described. In the manufacturing process of the capacitor body, a dielectric paste to become the dielectric layer after firing and a conductive paste to become the internal electrode after firing are prepared.

The dielectric paste is prepared, for example, by the following method. Ceramic materials are uniformly mixed by means such as wet mixing, dried, and heat-treated under predetermined conditions to obtain calcined powder. To the obtained calcined powder, an organic vehicle or an aqueous vehicle is added and kneaded to prepare a dielectric paste.

A dielectric green sheet is obtained by forming the obtained dielectric paste into a sheet by a doctor blade method or the like. In addition, the dielectric paste may include an additive selected from various dispersants, plasticizers, dielectrics, subcomponent compounds, or glass as needed.

Conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is applied in a predetermined pattern by various printing methods such as screen printing or a transfer method. After stacking a plurality of layers of dielectric green sheets on which internal electrode patterns are formed, a dielectric green sheet stack is obtained by pressing in the stacking direction. At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack is treated to remove the binder and fired, obtaining the capacitor body.

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining about 180° C. to about 400° C. for about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1200° C. to about 1350° C. or about 1220° C. to about 1300° ° C. for about 0.5 hours to about 8 hours or about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be about $1.0 \times 10^{-14}$ MPa to about $1.0 \times 10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for about 0 hour to about 20 hours by increasing the temperature at about 50° C./hour to about 500° C./hour. The annealing may be performed under a humid nitrogen gas ($N_2$) atmosphere, wherein an oxygen partial pressure may be about $1.0 \times 10^{-9}$ MPa to about $1.0 \times 10^{-5}$ MPa.

In the binder removal treatment, the firing treatment, or the annealing treatment, in order to humidify nitrogen gas, mixed gas, or the like, a wetter or the like may be for example, used, wherein a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrodes on the outer surfaces of the third and fourth surfaces, thereby improving the electrical connection of the first and second external electrodes and the first and second internal electrodes and easily forming the alloy portion.

Optionally, on the outer surface of the obtained capacitor body, a paste for forming a first layer is coated and sintered to form a first layer.

The paste for forming the first layer may include a conductive metal and glass. The conductive metal and the glass are the same as described above and will not be repeated illustrated again. In addition, the paste for forming the first layer may optionally include a subcomponent such as a binder, a solvent, a dispersant, a plasticizer, or oxide powder. For example, the binder may include ethyl cellulose, acryl, butyral, or the like, and the solvent may use an organic solvent such as terpineol, butyl carbitol, alcohol, methylethylketone, acetone, or toluene, and the like or an aqueous solvent.

A method of coating the paste for forming the first layer on the outer surface of the capacitor body may include various printing methods such as a dip method, or screen printing, and the like, a coating method by using a dispenser, a spray method by using a spray, and the like. The paste for forming the first layer may be coated on at least the third and fourth surfaces of the capacitor body, and optionally, on a portion of the first surface, the second surface, the fifth surface, or the sixth surface where the band portions of the first and second external electrodes are formed Subsequently, the capacitor body on which the paste for forming the first layer is coated is dried and then sintered at a temperature of about 700° C. to about 1000° C. for about 0.1 hour to about 3 hours to form a first layer.

On the outer surface of the obtained capacitor body, a paste for forming a second layer is coated and cured to form a second layer.

The paste for forming the second layer may include a resin and conductive polymer particles. The resin and conductive polymer particles are the same as described above and will not be repeated illustrated again. In addition, the paste for forming the second layer may optionally include a subcomponent such as a binder, a solvent, a dispersant, a plasticizer, or an oxide powder. For example, the binder may include ethyl cellulose, acryl, butyral, or the like, and the solvent may include an organic solvent such as terpineol, butyl carbitol, alcohol, methylethylketone, acetone, or toluene, and the like or an aqueous solvent.

For example, in the paste for forming the second layer, a content of the conductive polymer particles relative to the total weight of the resin and the conductive polymer particles may be about 30 wt % to about 85 wt %, for example about 50 wt % to about 80 wt %. When a content of the conductive polymer particles in the paste for forming the second layer is less than about 30 wt %, conductivity may be reduced, and when it exceeds about 85 wt %, paste workability may be reduced.

For example, a method of forming the second layer may include dipping the capacitor body 110 into the paste for forming the second layer to form the second layer and curing it, screen-printing or gravure-printing the paste for forming the second layer on the surface of the capacitor body 110, or coating the paste for forming the second layer on the surface of the capacitor body 110 and then curing it.

However, the paste for forming the second layer may be coated so as to cover a portion of the first layer and leave other portions exposed. For example, the paste for forming the second layer may be coated such that the second layer is not located on the second surface, but on the first surface, a portion of the third surface, a portion of the fifth surface, and a portion of the sixth surface.

Subsequently, a third layer is formed outside the second layer.

For example, the third layer may be formed by a plating method, or may be formed by sputtering or electroplating (electric deposition).

Hereinafter, specific embodiments of the invention are presented. However, the examples described below are only for specifically illustrating or explaining the invention, and the scope of the invention is not limited thereto.

Preparation Example: Manufacturing of Multilayered Capacitor

Example 1

A paste including barium titanite (BaTiO₃) powder is coated on a carrier film and then dried, manufacturing a plurality of dielectric green sheets.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Next, a paste for the sintered metal layer containing copper (Cu) as the glass and conductive metal is coated on the outer surface of the capacitor body by dip method, dried, and sintered to form the sintered metal layer.

Subsequently, a paste for a conductive resin layer including an epoxy resin and conductive polymer particles is coated on a portion of the first surface of the capacitor body in a dip coating method and then dried and cured, forming a conductive resin layer. Herein, the paste for a conductive resin layer contains 65 wt % of the conductive polymer particles based on a total weight of the epoxy resin and the conductive polymer particles, wherein the conductive polymer particles are obtained by forming an Ag metal coating layer with an average thickness of 50 nm on the surface of PMMA polymer particles with an average particle diameter of 2 μm.

Subsequently, nickel (Ni) and tin (Sn) are plated thereon, manufacturing a multilayered capacitor.

Comparative Example 1

A paste including barium titanite (BaTiO₃) powder is coated on a carrier film and then dried, manufacturing a plurality of dielectric green sheets. At this time, the ceramic raw material includes Tb as a subcomponent.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Next, a paste for the sintered metal layer containing copper (Cu) as the glass and conductive metal is coated on the outer surface of the capacitor body by dip method, dried, and sintered to form the sintered metal layer.

Subsequently, a paste for a conductive resin layer including an epoxy resin and copper (Cu) powder as the conductive metal is coated on a portion of the first surface of the capacitor body in a dip coating method and then dried and cured, forming a conductive resin layer.

Subsequently, nickel (Ni) and tin (Sn) are plated on the capacitor body having the conductive resin layer, manufacturing a multilayered capacitor.

Comparative Example 2

A paste including barium titanite (BaTiO₃) powder is coated on a carrier film and then dried, manufacturing a plurality of dielectric green sheets. At this time, the ceramic raw material includes Tb as a subcomponent.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Next, a paste for the sintered metal layer containing copper (Cu) as the glass and conductive metal is coated on the outer surface of the capacitor body by dip method, dried, and sintered to form the sintered metal layer.

Subsequently, a paste for a conductive resin layer including polypyrrole and copper (Cu) powder as the conductive metal is coated on a portion of the first surface of the capacitor body in a dip coating method and then dried and cured, forming a conductive resin layer.

Subsequently, nickel (Ni) and tin (Sn) are plated on the capacitor body having the conductive resin layer, manufacturing a multilayered capacitor.

Experimental Example 1: Performance Analysis of Multilayered Capacitor

Bending strength and acoustic noise performance of the multilayered capacitors according to Example 1 and Comparative Examples 1 and 2 are measured, and the results are shown in Table 1.

The bending strength is measured by mounting each of them on a substrate with a size of 100 mm×40 mm and a thickness of 1.6 mm and then pressing it at 1 mm/s.

The acoustic noise is measured by using a product with a size of 1.6 mm×0.8 mm under conditions of 12.5 V (DC)+2 Vpp (AC), a frequency of 300 kHz to 20 kHz, and a sine wave.

TABLE 1

|  | Bending strength | Reduction effect of acoustic noise |
| --- | --- | --- |
| Example 1 | 10 mm | −7 dBA |
| Comparative Example 1 | 5 mm | −1 dBA |
| Comparative Example 2 | 8 mm | −3 dBA |

Referring to Table 1, the multilayered capacitor of Example 1 exhibits a lower modulus, thereby improving the bending strength and reducing the acoustic noise of the substrate caused by vibration of the multilayered capacitor.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

100: multilayered capacitor
110: capacitor body
111: dielectric layer
121: first internal electrode
122: second internal electrode
131: first external electrode
132: second external electrode
1311, 1321: first layer
1312, 1322: second layer
1313, 1323: third layer
110a, 110b: first and second surfaces
110e, 110f: third and fourth surfaces
110c, 110d: fifth and sixth surfaces
131a, 132a: first electrode portion
131b, 132b: second electrode portion
131c, 132c: third electrode portion
131e, 132e: fourth electrode portion
131c1, 132c1: first region
131c2, 132c2: second region
131e1, 132e1: first region
131e2, 132e2: second region

What is claimed is:

1. A multilayered capacitor, comprising
a capacitor body including a dielectric layer and an internal electrode, and
an external electrode disposed outside the capacitor body, wherein the external electrode includes
a first layer connected to the internal electrode, and
a second layer covering at least a portion of the first layer, and
the second layer includes a resin and conductive polymer particles,
wherein at least one of the conductive polymer particles includes a metal coating layer on a surface thereof, and wherein the conductive polymer particles include polymethylmethacrylate (PMMA), polymethylacrylate (PMA), polystyrene, or a combination thereof.

2. The multilayered capacitor of claim 1, wherein the conductive polymer particles include polypyrrole, polyaniline, polythiophene, [poly (3,4-ethylenedioxythiophene)]:[poly (styrene sulfonate)] (PEDOT:PSS), or a combination thereof.

3. The multilayered capacitor of claim 1, wherein an average particle diameter of the conductive polymer particles is about 0.1 μm to about 5 μm.

4. The multilayered capacitor of claim 1, wherein the metal coating layer of the at least one of conductive polymer particles includes nickel (Ni), copper (Cu), aluminum (Al), silver (Ag), gold (Au), platinum (Pt), lead (Pb), tin (Sn), an alloy thereof, or a combination thereof.

5. The multilayered capacitor of claim 1, wherein an average thickness of the metal coating layer is about 5 nm to about 200 nm.

6. The multilayered capacitor of claim 1, wherein the capacitor body has first and second surfaces facing each other in a stacking direction of the dielectric layer and the internal electrode, third and fourth surfaces facing each other in a longitudinal direction perpendicular to the stacking direction, and fifth and sixth surfaces facing each other in a width direction perpendicular to the stacking direction and the longitudinal direction,
in a cross section cut perpendicular to the width direction from a center of the width direction of the multilayered capacitor in the longitudinal direction and stacking direction,
an average length in the stacking direction of the second layer disposed on the third or fourth surface is about 20% to about 70% of an average length in the stacking direction of the external electrode, and
an average length in the longitudinal direction of the second layer disposed on the first surface is about 80% to about 100% of an average length in the longitudinal direction of the external electrode.

7. The multilayered capacitor of claim 1, wherein the second layer covers a portion of the first layer and exposes other portions of the first layer.

8. The multilayered capacitor of claim 7, wherein the capacitor body has first and second surfaces facing each other in a stacking direction of the dielectric layer and internal electrode, third and fourth surfaces facing each other in a longitudinal direction perpendicular to the stacking direction, and fifth and sixth surfaces facing each other in a width direction perpendicular to the stacking direction and the longitudinal direction, and
the second layer is disposed only on the first surface.

9. The multilayered capacitor of claim 8, wherein the external electrode further includes a third layer covering the first layer and second layer.

10. The multilayered capacitor of claim 9, wherein the first layer is disposed on the first surface, the second surface, and the third or fourth surface,
the second layer is disposed on the first surface and the third or fourth surface, and
the third layer is disposed on the first surface, the second surface, and the third or fourth surface.

11. The multilayered capacitor of claim 10, wherein the first, second, and third layers are disposed on the fifth and sixth surfaces.

12. The multilayered capacitor of claim 8, wherein at the third or fourth surface, an average length in the stacking direction of the second layer is less than or equal to an average length in the stacking direction of the first layer.

13. The multilayered capacitor of claim 8, wherein no portion of the second layer is disposed on the second surface.

14. The multilayered capacitor of claim 1, wherein the second layer further includes a conductive metal.

15. A method of manufacturing a multilayered capacitor, comprising
- manufacturing a capacitor body including a dielectric layer and an internal electrode, and
- forming an external electrode outside the capacitor body,
- wherein the forming of the external electrode includes:
- forming a first layer outside the capacitor body, and
- coating a paste for forming a second layer including a resin and conductive polymer particles to cover at least a portion of the first layer to form the second layer
- wherein at least one of the conductive polymer particles includes a metal coating layer on a surface thereof, and wherein the conductive polymer particles include polymethylmethacrylate (PMMA), polymethylacrylate (PMA), polystyrene, or a combination thereof.

16. The method of claim 15, wherein
- in the paste for forming the second layer, a content of the conductive polymer particles relative to the total weight of the resin and the conductive polymer particles is about 30 wt % to about 85 wt %.

17. The method of claim 15, wherein
- the paste for forming the second layer is coated such that a portion of the first layer is covered by the second layer and other portions of the first layer are exposed by not being covered by the second layer.

18. The method of claim 15, further comprising
- forming a third layer covering the first and second layers.

* * * * *